(12) United States Patent
Traint

(10) Patent No.: US 7,948,521 B2
(45) Date of Patent: May 24, 2011

(54) BI-DIRECTIONAL IMAGE RECORDING AND REPRODUCTION SYSTEM

(76) Inventor: Andreas Traint, Edlitz (AT)

( * ) Notice: Subject to any disclaimer, the term of this patent is extended or adjusted under 35 U.S.C. 154(b) by 331 days.

(21) Appl. No.: 12/097,061

(22) PCT Filed: Dec. 13, 2006

(86) PCT No.: PCT/EP2006/069645
§ 371 (c)(1),
(2), (4) Date: Jun. 12, 2008

(87) PCT Pub. No.: WO2007/068713
PCT Pub. Date: Jun. 21, 2007

(65) Prior Publication Data
US 2008/0278616 A1 Nov. 13, 2008

(30) Foreign Application Priority Data
Dec. 14, 2005 (AT) .................................. A 1994/2005

(51) Int. Cl.
*H04N 5/225* (2006.01)
(52) U.S. Cl. .................... 348/218.1; 348/37; 348/207.99

(58) Field of Classification Search .................... 348/37, 348/218.1
See application file for complete search history.

(56) References Cited

U.S. PATENT DOCUMENTS

| | | | | |
|---|---|---|---|---|
| 4,982,092 | A | * | 1/1991 | Jehle .............................. 250/332 |
| 5,790,183 | A | * | 8/1998 | Kerbyson ......................... 348/37 |
| 5,801,758 | A | * | 9/1998 | Heirich ....................... 348/14.16 |
| 7,385,623 | B2 | | 6/2008 | Traint ........................ 348/14.16 |
| 2005/0041218 | A1 | * | 2/2005 | Hoshino et al. ................. 353/94 |
| 2005/0105179 | A1 | | 5/2005 | Taira ............................. 359/463 |
| 2005/0206722 | A1 | * | 9/2005 | Traint ............................. 348/36 |

\* cited by examiner

*Primary Examiner* — David L Ometz
*Assistant Examiner* — Antoinette T Spinks
(74) *Attorney, Agent, or Firm* — Andrew Wilford

(57) ABSTRACT

According to the invention, rotating cylinders (1) are provided in at least two locations. Stripes (3) comprising light emitting elements and stripes (2) comprising a recording system resembling a scanner strip are mounted on the rotating cylinders (1) such that the surroundings of one cylinder can be represented on the other cylinder, visual contact being possible. The inventive system can also be configured in a planar manner, e.g. on a revolving band or a plate that is moved back and forth. Said system can also be configured for three-dimensional representation.

12 Claims, 3 Drawing Sheets

BI-DIRECTIONAL IMAGE RECORDING AND REPRODUCTION SYSTEM

CROSS REFERENCE TO RELATED APPLICATIONS

This application is the US national phase of PCT application PCT/EP2006/069645, filed 13 Dec. 2006, published 21 Jun. 2007 as WO 2007/068713, and claiming the priority of Austrian patent application A1994/2005 itself filed 14 Dec. 2005, whose entire disclosures are herewith incorporated by reference.

The invention relates to a system for bidirectional image recording and reproduction at least two locations each with at least one recording system and one reproduction system.

PRIOR ART

Such a system is known from WO 2004/002151 [U.S. Pat. No. 7,385,623]. Each location is provided with a vertical cylinder that rotates about its axis. The cylinder has vertical strips alternating matte for the projection of an image and transparent for the recording of an image.

Fixed television cameras are mounted in the middle of the cylinder that record images in different directions so that on the whole the entire horizontal area (360°) is recorded. Furthermore, each station has fixed projectors set in the middle of the column and each projector projects the image of the corresponding camera of the other station onto the matte strips. The cylinder rotates at such a high speed that movement of the strips can no longer be perceived by the human eye. The cameras are therefore illuminated sufficiently uniformly by the transparent strips that are rapidly passing by. The light emitted from the projectors can not pass to the cameras of the same station due to partitions, so that no disturbances occur here.

In this manner the entire surroundings of the other cylinder are seen on the total circumference of each cylinder. If a transfer of sound is also provided, it is possible to speak with a person in front of the other column, and it should be particularly emphasized that visual contact is possible because the recording takes place at the reproduction area.

In traditional conference systems each of the partners in the conversation looks at his monitor but is recorded by a camera arranged above, below or to the side of the monitor. Therefore, in these systems no visual contact with the partner in the conversation is possible, which results in images that are not true to life. This disadvantage has already been eliminated by WO 2004/002151. However, this system has the problem that it is difficult to make the transition area between the cameras so smooth that no flutter can be recognized by the observer.

OBJECT OF THE INVENTION

The object of the invention is to eliminate these disadvantages and improve the system of the above-described type in such a manner that it can be done with less technical complexity and that there are no longer any recognizable transitions between different images.

This object is attained in accordance with the invention by a system of the above-described type in that the reproduction system is formed by at least one strip of light-emitting elements such as light-emitting diodes, LCD elements, TFT elements or the like, that the recording system detects a strip of the image to be recorded like a scanner, and that the entire system is moved either back-and-forth or in an orbit, during which the direction of movement is different from the direction of the strips, preferably approximately perpendicular to it, such that in the case of several reproduction system strips and recording system strips the recording system strips are arranged between the reproduction system strips and that the movement speed is selected to be so high that the time between the passage of succeeding reproduction system strips and the time between the passage of succeeding recording system strips is less than the resolution of the human eye.

Therefore, according to the present invention there is neither a fixed recording system nor a fixed reproduction system. Both systems are moved. As a result, a television camera is no longer necessary that scans an image section both horizontally as well as vertically. A type of scanner bar (or in-line array with lenses) is sufficient that scans the image in only one dimension; in the other dimension the scanning takes place by moving the system.

If the two stations are constructed in the same manner and move synchronously, reproduction is very simple: Each pixel of a reproduction system strip need only reproduce the information that corresponds to the respective pixel of the corresponding recording system strip of the other station.

According to an embodiment of the invention the system is designed in the form of a body of rotation that rotates about its axis and whose outer surface carries the reproduction system strips; it is preferably a sphere or a vertical cylinder, as is known from WO 2004/002151.

However, this is not absolutely necessary. In principle, a single strip that orbits about an axis is sufficient. This strip can have the shape of a semicircle through whose ends the vertical axis runs; or the strip is planar, runs vertically and is connected by two horizontal webs to the vertical shaft so that a horizontal U results. In order that no imbalance arises, it is, however, more favorable to provide two opposite strips so that an entire strip or a rectangle then results.

Of course, this arrangement can also be modified so that the shaft is not vertical. This applies to all embodiments.

It is advantageous in a vertical cylinder if recording system strips in the form of scanner bars are attached between the reproduction system strips and all the elements of the scanner bars focuses in the same direction so that extensions of these directions intersect approximately at the cylinder axis. This feature produces a decrease in size of objects is the same in the vertical and in the horizontal direction with increasing spacing from the cylinder, so that no distortions occur. In the case of a sphere as the body of rotation this feature results automatically if each element focuses in a direction perpendicular to the sphere surface.

Alternatively, it is also possible that transparent strips are provided between the reproduction system strips, that mirrors are attached behind the transparent strips, and that scanner bars with a lens are attached between the transparent areas and the mirrors whose spacing from the mirrors corresponds approximately to the spacing of the mirrors from the cylinder axis. Thus, one lens is sufficient here that projects the detected image onto the scanner bar. When the spacing from the mirror corresponds to the spacing of the mirrors from the axis of rotation the main points of the scanner lenses are then visible in the axis of rotation so that here too the diminution of objects is the same in a vertical and in the horizontal direction with increasing spacing from the cylinder, so that no distortions occur.

Another embodiment of the invention provides that the system is designed in the form of a rotating flexible band that extends in one region in a plane and that the recording system strips and the reproduction system strips are activated in the planar region, so that image recording and image reproduction take place in this planar region.

Alternatively, in order to reproduce a planar image the system can be designed as a planar surface that is moved back and forth. If a reciprocating movement is to be avoided, the system can also be constructed in the form of a strip or in the form of a disk that rotates about its middle point, during which the axis of rotation extends perpendicular to the strip or disk.

Finally, it is possible that the recording system and the reproduction system are designed for special presentation.

BRIEF DESCRIPTION OF THE DRAWINGS

Embodiments of the invention are schematically shown in the attached drawings.

WAYS OF CARRYING OUT THE INVENTION

Figure 1:
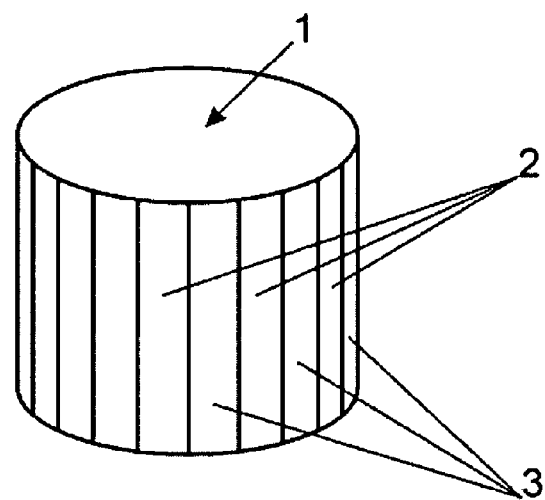
FIG. 1 shows a first embodiment of the invention.
Figure 2:
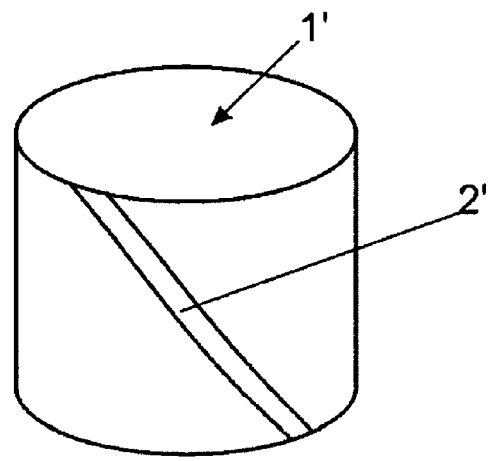
FIG. 2 shows a variant of it with obliquely running recording system strips.

FIG. 1 shows a cylinder 1 with a vertical axis. Recording system strips 2 and reproduction system strips 3 alternate on its circumference. In FIG. 1 these strips run vertically, that is, parallel to the axis of cylinder 1. However, they can also run obliquely at any angle. This is indicated in FIG. 2, where a recording system strip 2' runs obliquely on the surface of cylinder 1'. Of course, further recording system strips are also present here—as in FIG. 1—and reproduction system strips are also present between them. It is important that rotation of cylinder 1 and 1' passes each point on the cylinder surface alternately over by a recording system strip 2 and over a reproduction system strip 3. Therefore, in the arrangement selected in FIG. 1 the strips must not run in the direction of rotation, that is, not lie horizontally.

Very different light-generating elements can be attached on the reproduction system strips. In the case of large cylinders LED's are most appropriate since they are still considered to be the strongest light sources given the current technical possibilities, so that the images can still be readily perceived by the human eye even in sunlight. However, other technologies are also conceivable such as liquid crystal display technologies (LCD), plasma display technologies (PDP), laser techniques, TFT etc.

For example, 480 superposed LED's can be provided in each strip 3. For colored images, three LED's must always be provided adjacent each other, a red one, a blue one and a green one. That results in 1440 LED's. Instead of them, even LED's that can be controlled in a multi-color manner can be used.

If it is desired to increase the resolution even more, the LED's in the adjacent strip 3 can be offset by one half the vertical spacing of the LED's. This then results in a total of 960 lines during rotation of the cylinder 1.

It would be basically also conceivable to generate light in a manner similar to that of CRT monitors, in which the electron beam must here only be deflected here in one direction (perpendicular to the direction of rotation, that is, parallel to the axis of rotation), or, however, with projectors ("beamers") in retrograde projection whose light beams are deflected only in this direction. Likewise, an LED retrograde projection is possible or, however, the use of three differently colored lasers in back projection.

Figure 3:
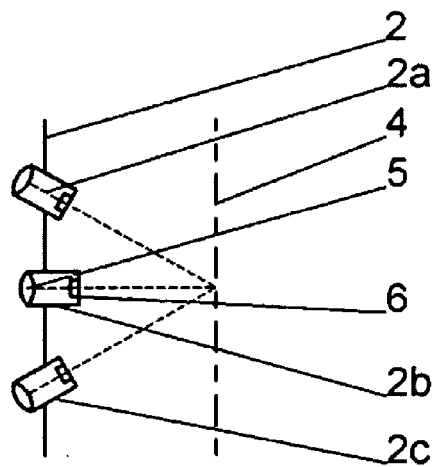
FIG. 3 is a schematic section through a recording system strip.

Recording system strips 2 can have photosensitive elements on their outside, quite analogous to scanner bars like those used in flatbed scanners. The direction from which each photosensitive element can receive light is different. In a flatbed scanner all photosensitive elements "look" in the same direction, which is not desired in the present case. The rotation of the cylinder 1 results for horizontally incident beams in location of the observer at the cylinder axis. In order to avoid distortions this should also be the case for the remaining beams. For this reason the arrangement schematically indicated in FIG. 3 should be adopted. In FIG. 3 the individual sensors are shown greatly enlarged so that only three sensors 2a, 2b and 2c (one above, one in the middle and one below) can be shown. However, the number of sensors actually corresponds to the number of LED's, that is, e.g. 480 sensors are arranged in a superposed manner.

Each sensor 2a, 2b, 2c comprises a collector lens 5 and a photosensitive element 6. The collector lens 5 focuses a parallel beam from a certain direction on the photosensitive element 6. In order to avoid distortions the retrograde extensions of these directions (sketched in FIG. 3 with dotted lines) should intersect on the cylinder axis 4.

For color transmissions three recording sensors (one sensitive to red light, one sensitive to green light and one sensitive to blue light) must of course also be provided adjacent each other. For higher resolutions the sensors can of course be arranged in the adjacent recording system strip vertically offset by one half their vertical spacing so that the number of lines is increased.

In order to represent the surroundings of the other station on one station it is sufficient in the simplest case to allow the cylinders of the two stations to run synchronously and to control an LED of a reproduction system strip 3 with the signal of the corresponding sensor in the corresponding recording system strip.

In practice, at least the signals of each RGB triplet (that is the red-sensitive, the green-sensitive and the blue-sensitive sensor) will of course be evaluated together and optimized relative to color, brightness and contrast and only then reproduced. A total evaluation and optimizing of the entire image is of course even better. The (optimized) signals of the sensors are of course transmitted in the multiplex process via a single line.

A great advantage of this system is the fact that one is completely independent of existing television standards. The number of LED's and photosensitive sensors can be optimally selected for each application and thus even very high-quality transmissions (high resolutions) can be achieved if necessary. The same is of course true for the number of strips 2 and 3 and for the speed of cylinder 1.

The number of strips 2 and 3 determines the necessary speed of cylinder 1. The eye should not be able to perceive the individual strips 2 and 3 so that, therefore, the time that elapses between the passage of two strips 3 should be less than 1/50 sec. In the case of 10 strips 3, five revolutions per second then result for cylinder 1. A lesser rotation speed brings about a longer illumination of the sensors so that the photosensitivity is therefore increased by a larger number of strips.

Figure 4:
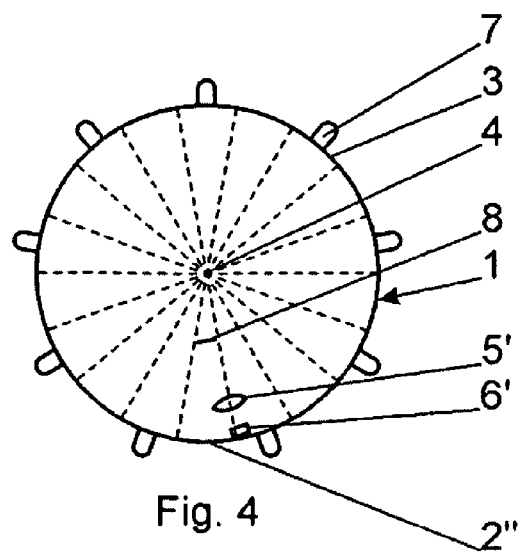
FIG. 4 is a horizontal section through another embodiment of the invention.

As is apparent from FIG. 4 the sensors do not have to be attached directly to recording system strips 2". These recording system strips 2" are simply transparent strips of cylinder 1 here. The reproduction system strips 3 are made recognizable by LED's 7 and the border between recording system strips 2 and reproduction system strips 3 is indicated by dotted lines.

A mirror 8 is located behind the recording system strip 2". This mirror reflects the light coming in through the recording system strip 2" onto a lens 5' that images the light on the sensor strips 6'. Thus, only one lens 5' (or a lens system) is present here for the entire sensor strip 6' (and not one lens for each sensor), quite analogously to traditional television cameras or photographic equipment. The spacing of the lens 5' from the mirror 8 corresponds approximately to the spacing of the mirror 8 from the cylinder axis 4. Thus, the lens 5' is visible approximately on the cylinder axis 4, which is favorable for avoiding distortion. In order that the sensor strip 6' itself is not in the beam path, the mirror 8 is shown somewhat angularly offset. Of course, the mirror 8 could just as well be angled up or down.

The reason why the mirror 8 is provided is the space problem. In FIG. 4 only one sensor strip 6' is shown, but, of course, such a sensor strip 6' is necessary for each recording system strip 2". Now, it is not possible for reasons of space to attach all the sensor strips 6' in the immediate vicinity of the cylinder axis 4. Therefore, mirrors 8 are used so that the sensor strips 6' and the lens 5' are visible in the vicinity of the cylinder axis 4 (that is, their mirror image is located in the vicinity of the cylinder axis 4).

Figure 5:
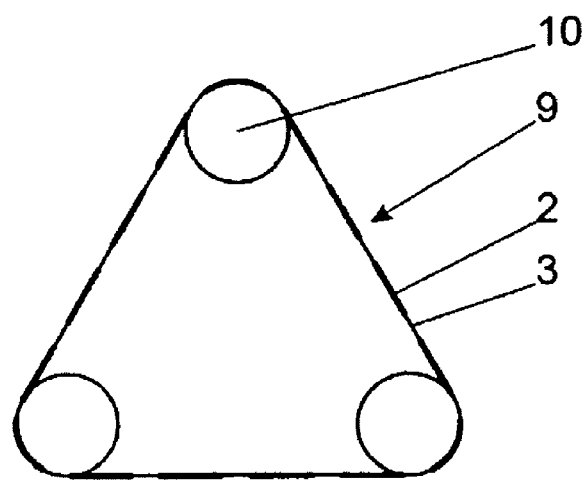
FIGS. 5, 6 and 8 show further embodiments of the invention in a top view.

FIG. 5 shows an embodiment in which the recording system strip 2 and the reproduction system strip 3 are mounted on an endless belt 9 that is carried on rollers 10. The rollers form straight faces that can be used for image recording and image reproduction. This differs in comparison to a cylinder 1 in that an exact parallel-perspective recording is possible. The individual recording sensors in a recording system strip 2 are therefore—unlike FIG. 3—all arranged parallel to each other.

Figure 6:
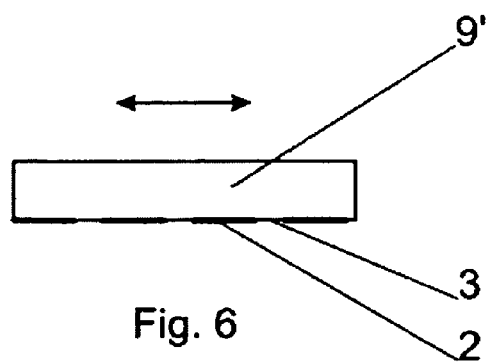

A similar situation applies to the embodiment according to FIG. 6 in which the recording system strip 2 and the reproduction system strip 3 are attached on a plate 9' that is reciprocated back and forth in the direction of the double arrow.

Figure 8:
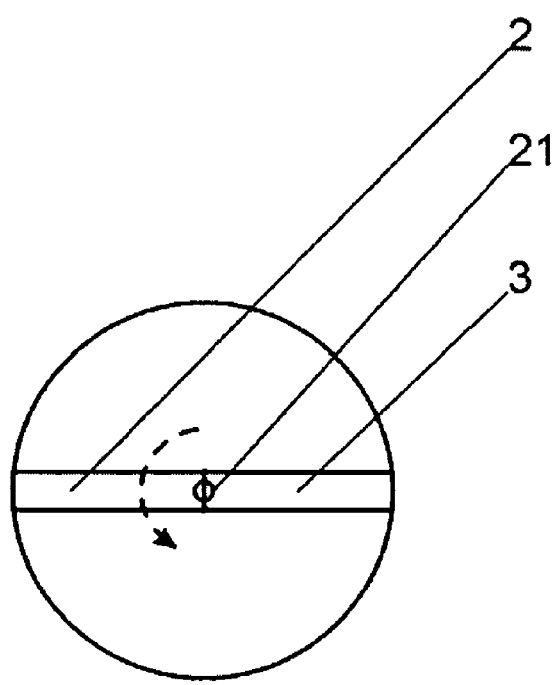

If a reciprocating movement is to be avoided, the embodiment according to FIG. 8 can be selected. Here, a strip is provided that rotates about a shaft 21. A recording system strip 2 is offset by 180° to a reproduction system strip 3 relative to this shaft 21 so that a continuous strip results. In this example the sensors "look" perpendicular to the plane of the drawing.

Of course, several strips can be provided so that, e.g. an angle of 30° is formed between the recording system strips and the reproduction system strips. In this instance a disk is advantageously provided on which the individual strips are attached.

Figure 7:
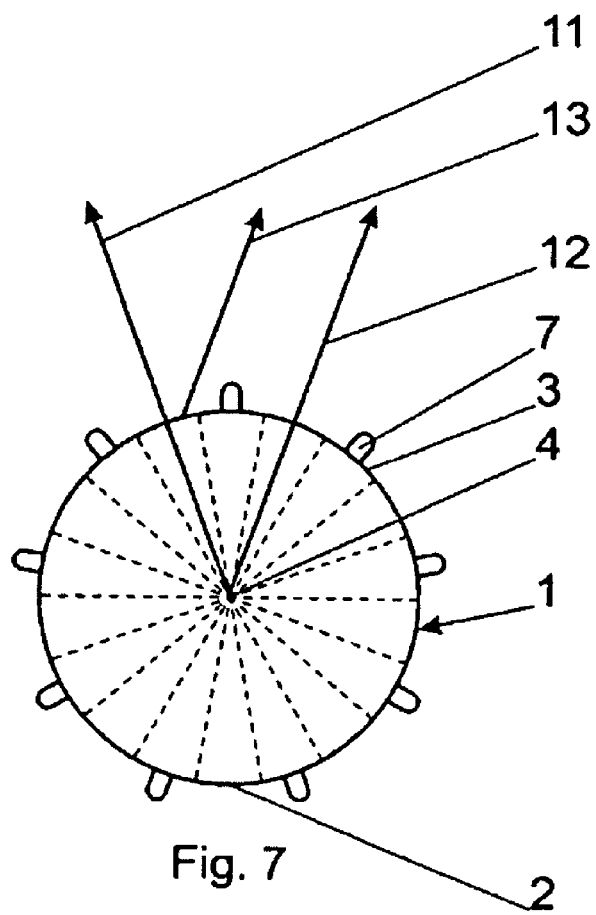
FIG. 7 shows an embodiment with stereoscopic image recording.

The embodiment with a cylinder has the advantage that it can be very readily designed for stereoscopic image reproduction, shown in FIG. 7. Normally the sensors in the recording system strips 2 all "look" radially outward, that is, they only receive light coming from this direction. In FIG. 7 these directions for two adjacent strips are designated with 11 and 12. In order to make stereoscopic image reproduction possible, one only has to attach further sensors that receive the light from another angle, as is indicated by arrow 13. These sensors "look" in the same direction as the sensors aligned to the arrow 12 so that these two sensors detect the parallax displacement. Of course, such additional sensors are to be provided in each recording system strip.

Hence, twice as many LED's are necessary for reproduction. In the simplest case the LED's, which are controlled by the "perpendicular" sensors, are polarized in one direction, e.g. horizontally, and the LED's that are controlled by the "obliquely looking" sensors are polarized in the direction perpendicular to it, e.g. vertically. If the observer is wearing appropriate polarization glasses, each eye receives only the light from the corresponding LED's so that the desired stereoscopic effect results.

If polarization glasses are to be avoided, so-called lenticular technology is available. Much literature is available for it and reference is made to EP 1521483 only by way of example. If—as is provided in this publication—more than two (e.g. 5) recording apparatuses are to be provided, this can also be readily realized within the scope of the present invention in that in each recording system strip the sensors are arranged in five different directions so that light can be detected from 5 different directions.

The invention claimed is:

1. A system for bidirectional image recording and reproduction at least two locations with at least one recording system and one reproduction system, the system comprising:
   a movable body;
   the reproduction system has at least one longitudinally elongated strip of light-emitting elements on the body,
   the recording system detects a strip of the image to be recorded in a manner of a scanner via a recording-system strip on the body, and
   means is provided for moving the body with both the reproduction system and the recording system either back-and-forth or in an orbit, during which the direction of movement is generally perpendicular to the strips, the movement speed being so high that the time between the passage of the reproduction system strip and the passage of the recording system strip is less than the resolution of the human eye.

2. The system according to claim 1 wherein there are a plurality of such reproduction system strips and recording system strips on the movable body, the recording system strips alternating with the reproduction system strips.

3. The system according to claim 2 wherein the body is a body of rotation that rotates about its axis and whose outer surface carries the reproduction system strips and the recording strips.

4. The system according to claim 3 wherein the body of rotation is a sphere.

5. The system according to claim 3 wherein the body of rotation is a vertical cylinder.

6. The system according to claim 5 wherein the recording system strips are scanner bars attached between the reproduction system strips and having multiple sensors that focus in a respective direction so that extensions of these directions intersect approximately in the area of the cylinder axis.

7. The system according to claim 2 wherein the movable body is a rotating flexible band that extends in one region in a plane and that the recording system strips and the reproduction system strips are activated in the planar region, so that the image recording and the image reproduction take place in this planar region.

8. The system according to claim 2 wherein the movable body is a planar surface that is reciprocated.

9. The system according to claim 1 wherein the movable body is a movable strip or a disk that rotates about its middle point and that has an axis of rotation that extends perpendicular to the movable strip or disk.

10. The system according to one of claims 1 wherein the recording system and the reproduction system are designed for three-dimensional representation.

11. The system according to claim 1 wherein the light-emitting elements are light-emitting diodes, LCD elements, or TFT elements.

12. A system for bidirectional image recording and reproduction at at least two locations with a recording system and a reproduction system, wherein the reproduction system is a cylinder centered on and rotatable about a vertical axis and having a surface carrying a plurality of axially elongated and angularly reproduction system spaced strips of light-emitting elements and transparent strips between and alternating with the reproduction system strips, mirrors are attached behind the transparent strips;

scanner bars with a lens are attached between the transparent areas and the mirrors whose spacing from the mirrors corresponds approximately to the spacing of the mirrors from the cylinder axis;

the recording system detects a strip of the image to be recorded in a manner of a scanner, and means is provided for rotating the cylinder about its axis such that the direction of movement is generally perpendicular to the strips, the movement speed being so high that the time between the passage of the reproduction system strip and the passage of the recording system strip is less than the resolution of the human eye.

* * * * *